US009144919B2

(12) United States Patent
Cui et al.

(10) Patent No.: US 9,144,919 B2
(45) Date of Patent: Sep. 29, 2015

(54) POWER TOOL HAVING DEPTH ADJUSTMENT MECHANISM

(75) Inventors: Ke Cui, Zhejiang (CN); Hepeng Zhang, Zhejiang (CN); Shuo Teng, Zhejiang (CN); Bing Zhu, Jiangsu (CN); Juergen Wiker, Schaumburg, IL (US)

(73) Assignee: Robert Bosch Tool Corporation, Mount Prospect, IL (US)

( * ) Notice: Subject to any disclaimer, the term of this patent is extended or adjusted under 35 U.S.C. 154(b) by 654 days.

(21) Appl. No.: 13/514,780

(22) PCT Filed: Dec. 21, 2009

(86) PCT No.: PCT/CN2009/075767
§ 371 (c)(1),
(2), (4) Date: Mar. 29, 2013

(87) PCT Pub. No.: WO2011/075879
PCT Pub. Date: Jun. 30, 2011

(65) Prior Publication Data
US 2013/0195575 A1 Aug. 1, 2013

(51) Int. Cl.
*B27C 5/10* (2006.01)
*B25F 5/00* (2006.01)
*B23C 1/20* (2006.01)

(52) U.S. Cl.
CPC . *B27C 5/10* (2013.01); *B25F 5/003* (2013.01); *B23C 1/20* (2013.01); *Y10T 409/306608* (2015.01); *Y10T 409/307952* (2015.01); *Y10T 409/308176* (2015.01)

(58) Field of Classification Search
CPC .................................... B23C 1/20; B27C 5/10
USPC ............... 409/182, 181, 75, 206; 144/136.95, 144/154.5
See application file for complete search history.

(56) References Cited

U.S. PATENT DOCUMENTS 3,466,973 A * 9/1969 Rees ............................ 409/182
7,275,900 B1 10/2007 Phillips et al.
(Continued)

FOREIGN PATENT DOCUMENTS

CN 1218587 A 6/1999
CN 1495000 A 5/2004
(Continued)

OTHER PUBLICATIONS

English Translation of First Office Action corresponding to Chinese Application No. 200980162546.4, agent letter dated Apr. 30, 2014 (7 pages).
(Continued)

*Primary Examiner* — Daniel Howell
*Assistant Examiner* — Yasir Diab
(74) *Attorney, Agent, or Firm* — Maginot Moore & Beck LLP

(57) ABSTRACT

A power tool having a depth adjustment mechanism includes a motor housing, a support base for supporting the motor housing, and a depth adjustment member coupled to the support base and movable between two positions. The depth adjustment member in a first position contacts a surface portion of the motor housing and in a second position is distanced from the surface portion of the motor housing such that the movement of the depth adjustment member from the first position to the second position is in a direction parallel to a plane that is substantially tangent to the surface portion of the motor housing.

9 Claims, 7 Drawing Sheets

(56) References Cited

U.S. PATENT DOCUMENTS

| | | |
|---|---|---|
| 7,334,614 B2 | 2/2008 | Cooper et al. |
| 2006/0102248 A1 | 5/2006 | Cooper et al. |
| 2008/0193240 A1* | 8/2008 | Zhu ............................ 409/182 |

FOREIGN PATENT DOCUMENTS

| | | |
|---|---|---|
| CN | 1504307 A | 6/2004 |
| CN | 2841229 Y | 11/2006 |
| CN | 201009086 Y | 1/2008 |
| CN | 201009090 Y | 1/2008 |
| WO | 0214035 A1 | 2/2002 |

OTHER PUBLICATIONS

International Search Report corresponding to PCT Application No. PCT/CN2009/075767, mailed Sep. 30, 2010 (5 pages).

* cited by examiner

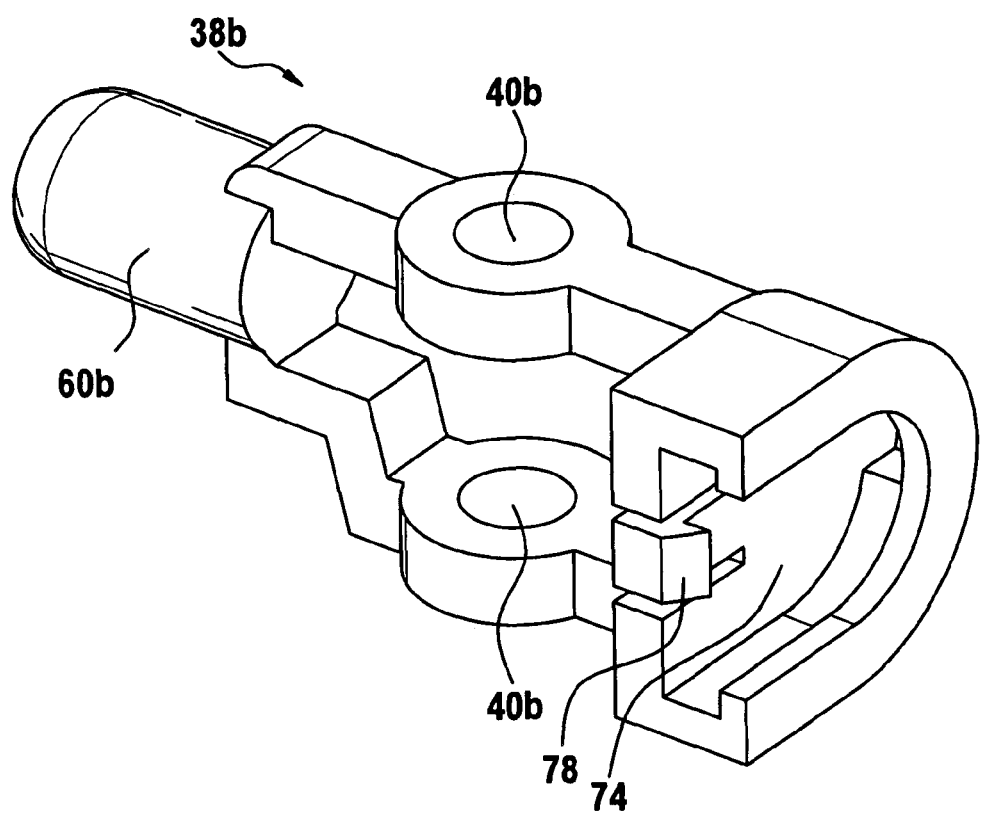

POWER TOOL HAVING DEPTH ADJUSTMENT MECHANISM

This application is a 35 U.S.C. §371 National Stage Application of PCT/CN2009/075767, filed on Dec. 21, 2009, the disclosure of which is incorporated herein by reference in its entirety.

The present disclosure relates to a power tool with means for adjusting the position of a tool bit relative to a support base. In particular it relates to convenient and inexpensive mechanism for switching between a fine and coarse depth adjustment mode in rotary tools such as routers, laminate trimmers, or drywall cutting tools.

BACKGROUND

A router, for example, typically has a base that contacts a work piece. A rotating tool bit is positioned relative to the base and cuts into the work piece. So as to increase the possible range of cuts that may be accommodated with a given tool bit as well as to permit the use of tool bits of different shapes and sizes, a router is conventionally provided with a depth adjustment mechanism. Fine depth adjustment is desirable for precision work, while coarse adjustment is desirable for changing bits or for doing deep cutting work.

U.S. Pat. No. 7,275,900 discloses a router which incorporates an elevating mechanism comprising a worm drive that in one position cooperates with a rack assembly mounted to the motor housing to enable fine adjustment of the position of the motor housing relative to its support base. Rotation of an eccentric lever urges the worm drive out of contact with the rack assembly in order to enable coarse adjustment of the motor housing.

SUMMARY

A power tool having a depth adjustment mechanism is described comprising a motor having a motor housing, a support base for supporting the motor housing, and a depth adjustment member coupled to the support base and movable between two positions, wherein the depth adjustment member in a first position contacts a surface portion of the motor housing and in a second position is distanced from the surface portion of the motor housing. Movement of the depth adjustment member from the first position to the second position is in a direction parallel to a plane that is substantially tangent to the surface portion of the motor housing. This manner of moving the depth adjustment member away from the motor housing may be preferable to a mechanism that involves swinging or rotation, in so far as a user can actuate such a movement with a single finger or thumb while at the same time grasping the support base. Movement in a straight line requires little force and is a natural movement.

The depth adjustment member may be a worm gear and the surface portion of the motor housing may comprise a plurality of teeth which are compatible with the worm gear. Such a worm and rack arrangement provides a convenient mechanism for fine adjustment and has the advantage that coarse adjustment is possible by moving the worm gear away from the plurality of teeth.

A biasing means may be provided for biasing the depth adjustment member into the first position. As opposed to a mechanism that involves moving the depth adjustment member into a second, stable position, the biasing means requires active force to retain the depth adjustment member in the second position. When the force is released from the depth adjustment member, the biasing means returns it automatically to the first, engaged position.

A conic spring may be provided for biasing the depth adjustment member into the first position. Such a biasing means has the advantage that it centers the carrier within the channel. Alternatively, such biasing may be accomplished via a pair of magnets that repel one another. Magnets have the advantage that they provide a long-lasting, non-mechanical biasing force that will not be damaged over the lifetime of the tool.

The depth adjustment member may be rotatable with respect to a carrier that is configured for moving the depth adjustment member from the first to the second position. This has the advantage that a single piece (i.e., the carrier) can position and support as well as urge the depth adjustment member by translating the bias from the biasing means.

The carrier may be positioned within a channel in the support base, wherein the channel has a plurality of channel walls. Such a channel has the advantage that it can provide a place for the carrier to remain associated with the support base, can provide features that properly position the carrier, and provide stability and guidance when the carrier is moved from the first to the second position.

A first channel wall is may be moveable with respect to the channel and movement of said first channel wall may control a clamping mechanism for clamping the support base to the motor housing. The first channel wall may be pivoted to reveal the inner workings of the depth adjustment mechanism. This advantageously aids in assembly and simplifies reassembly should parts need to be replaced. The same feature beneficially has the dual function of also mediating the clamping mechanism.

A portion of the carrier may extend through a second channel wall for allowing a user to move the carrier within the channel. Such an extension may be configured as a user-operable push button, which allows a user to conveniently manipulate the carrier even though it is positioned within the channel.

A longitudinal slot may be provided on a third channel wall such that the longitudinal slot is used as means for guiding the movement of the carrier within the channel. This has the advantage of restricting movement of the carrier while at the same time allowing the worm gear to turn freely. Such positioning can be advantageously used to ensure that the worm gear will not contact the walls of the channel in a way that would impair its function.

Adjustment means may extend through the longitudinal slot in the third channel wall for manipulating the depth adjustment member within the channel. Even though the depth adjustment member in the form of a worm gear is sealed within the cavity, convenient means for manipulating the worm gear may be provided outside of the channel in a place that provides convenient access to the user.

BRIEF DESCRIPTION OF THE DRAWINGS

FIG. 7 is a perspective view of a carrier according to a third embodiment of the disclosure.

DETAILED DESCRIPTION

Figure 1:
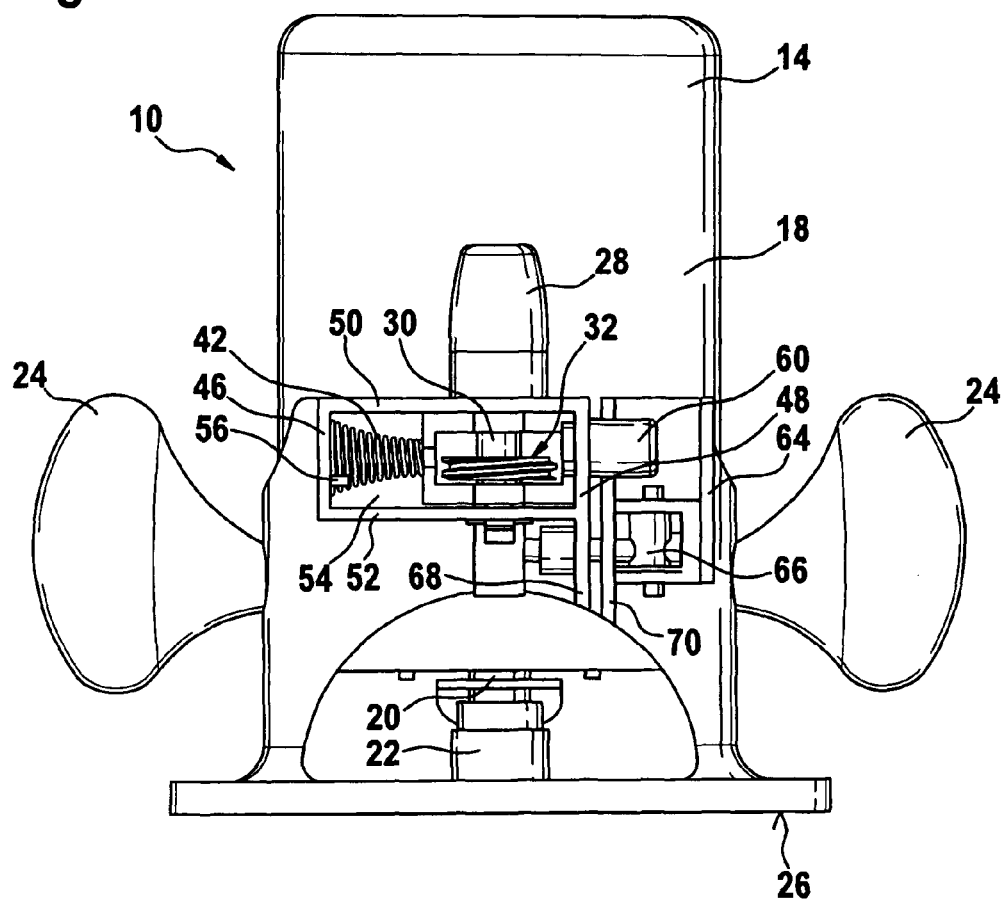
FIG. 1 is a front elevational view of a router in a fine adjustment position according to a first embodiment the present disclosure.

A router 10 having a fixed support base 12 fixing the position of a motor unit 14 is shown in FIG. 1. So that the position of motor unit 14 relative to support base 12 can be manipulated, a depth adjustment mechanism 16 is provided. Motor unit 14 includes a motor housing 18 for enclosing a motor (not shown) and preferably a gear transmission (not shown) for respectively generating and modulating high speed rotation of an output shaft 20. A tool bit (not shown) may be attached to output shaft 20 via various tool fixing means, such as collet nut 22. Power to the motor is provided either with an electrical cord for drawing AC power or via an intrinsic or removable rechargeable DC battery.

Support base 12 is further provided with handles 24 for guiding a substantially flat bottom surface 26 along a work piece. Alternatively, the router may inverted and secured to the underside of a conventional router table. In this case the router position is fixed and the user guides a workpiece across bottom surface 26. The adjustment mechanism that will be subsequently described works irrespective of whether the router is upright or inverted or whether it is stationary or fixed in position.

As will be described in detail, depth adjustment mechanism 16 may take on two configurations, one which facilitates fine adjustment (see FIG. 1) and the other facilitating coarse adjustment (see FIG. 2). A third configuration wherein neither fine nor coarse adjustment is possible is not illustrated, but will be described later. Fine adjustment is mediated by rotation of an adjustment knob 28 which is connected via worm shaft 30 to worm gear 32 associated with support base 12. Worm gear 32 serves as a depth adjustment member that in its default position engages with a compatible toothed rack 34 which comprises a surface portion of motor housing 18. Such adjustment is considered "fine" or "precision" adjustment, since one full rotation of adjustment knob 28 will move motor unit 14 only about ¹⁄₁₆" (1.6 mm) up and down with respect to support base 12.

Figure 2:
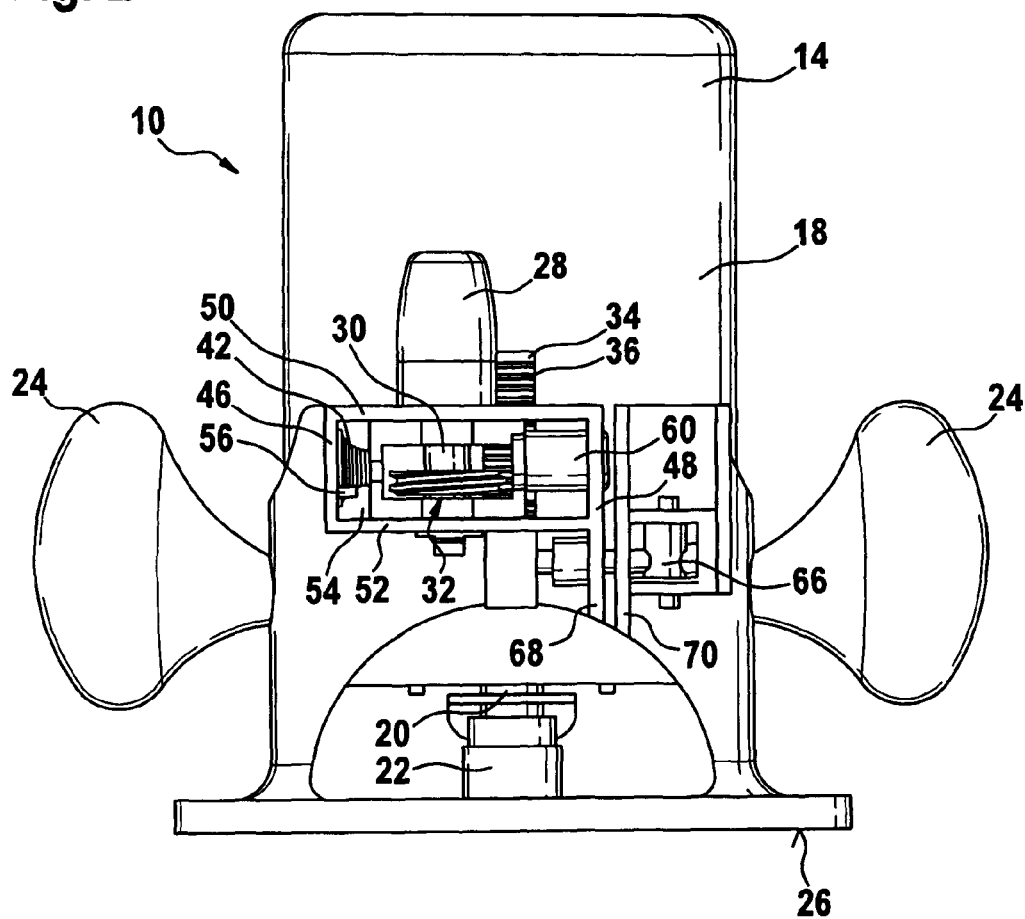
FIG. 2 is a front elevational view of the router in a coarse adjustment position.

Toothed rack 34 is generally flat-shaped with numerous protruding teeth 36 (see FIG. 2).

Toothed rack 34 is preferably constructed separately from the remainder of the generally cylindrical motor housing 18 and fixed to it, either by being partially recessed into the motor housing 18 or not recessed so that it slightly protrudes from motor housing 18. While it is generally flat-shaped, it may also be slightly arc-shaped so as to conform with the overall cylindrical shape of motor housing 18. Toothed rack 34 may alternatively be an intrinsic part of motor housing 18, with teeth 36 that are formed into motor housing 18, for example during manufacture of the housing via a molding process. Whether it is flat or arc-shaped along its width, toothed rack 34 is substantially planar and defines a first generally planar surface from which teeth 36 protrude. Since the teeth are uniform in shape, the outermost portions of teeth 36 may be thought to lay on a second generally planar surface parallel to the first generally planar surface.

Figure 3:
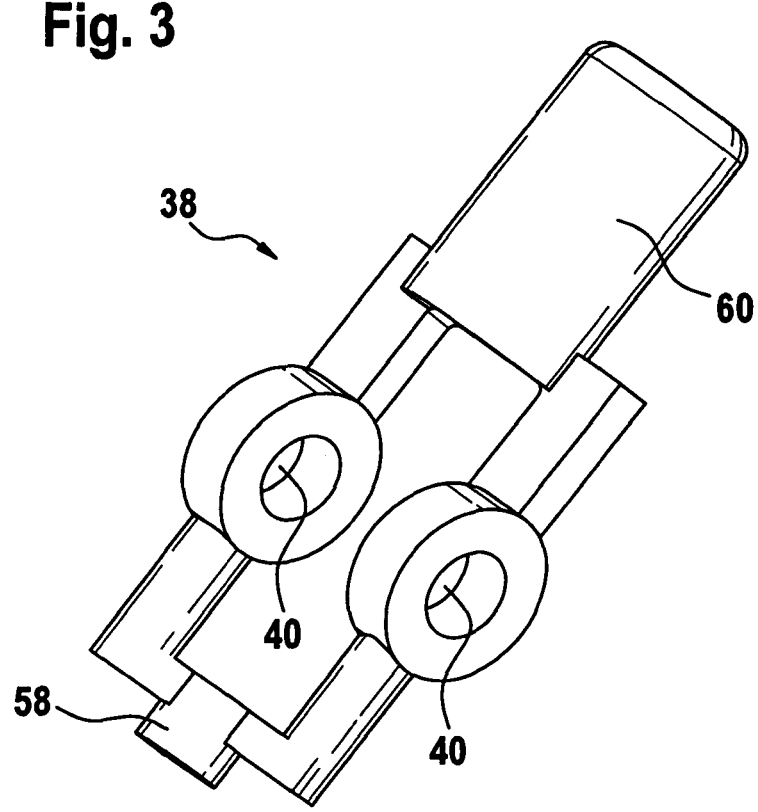
FIG. 3 is a perspective view of a carrier which is a component of the depth adjustment mechanism.

A bracket 38 serves as a carrier for worm gear 32 (see FIG. 3). Bracket 38 includes two mounting apertures 40 for supporting and allowing worm shaft 30 and therefore worm gear 32 to rotate. Bracket 38 can be moved from the default position (see FIG. 1) wherein worm gear 32 engages toothed rack 34 to a displaced position (see FIG. 2) wherein worm gear 32 is distanced from toothed rack 34. In this displaced position, coarse depth adjustment is possible, since a user is able to slide motor unit 14 with respect to support base 12. This is referred to as "coarse", "rough" or "fast" adjustment since motor unit 14 can be rapidly moved several inches (for example, around 5 cm) relative to support base 12.

Biasing means, such as coil spring 42, urges bracket 38 into the default position. Bracket 36 is confined to a channel 44 formed within a portion of support base 12. Channel 44 is largely defined by end channel walls 46 and 48 as well as top channel wall 50 and bottom channel wall 52. Coil spring 42 is preferably a conic spring and it is retained in position by having the larger part of the cone shape retained snugly within channel 44 via rear channel wall 54 and retaining protrusion 56 which extends from channel wall 46. The smaller aspect of the cone shape of coil spring 42 mates with a protrusion 58 on bracket 38 and is oriented so as to urge bracket 38 away from channel wall 46. Due to the conic shape of the spring, the bracket is centered within cavity 44. A push button 60 extends through channel wall 48 at the opposite end of channel 44 (see FIG. 1). This permits a user to manually urge bracket 36 in a direction opposite the biasing force of coil spring 42 (see FIG. 2).

Figure 4:
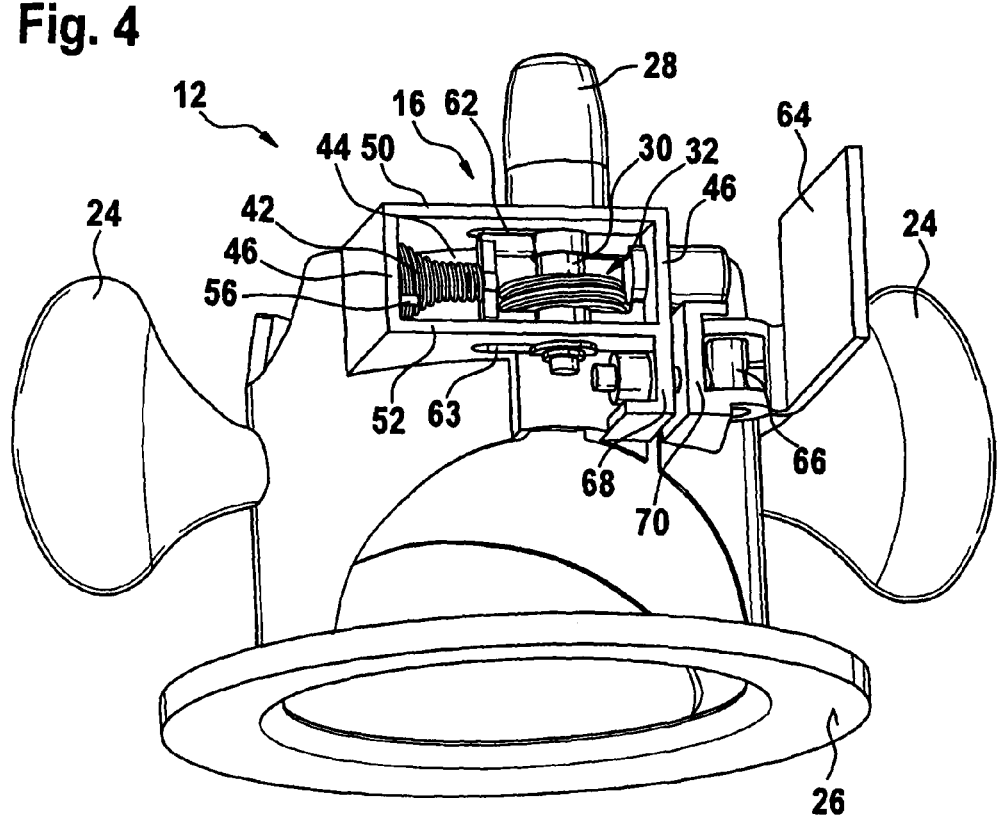
FIG. 4 is a bottom front perspective view of the router base in isolation.

In order to further support and limit the travel of bracket 38 within channel 44, top channel wall 50 is provided with a guide slot 62 and bottom channel wall 52 is provided with guide slot 63 through which worm shaft 30 extends. An end portion of worm shaft 30 that extends through guide slot is attached to an adjustment knob 28 (see FIG. 4) which slides generally along the top surface of top channel wall 50.

Access to channel 44 is provided by a front channel wall 64 that is configured like a swinging door. Front channel wall 64 acts also as a cam lever with respect to a pin clamp 66 that is configured to either separate or bring together flanges 68 and 70 of support base. This comprises a depth locking mechanism. When channel wall 64 is in the open configuration (see FIG. 4), flanges 68 and 70 are separated, thereby allowing either fine or coarse depth adjustment. When channel wall 64 is in the closed configuration (not shown) pin clamp 66 acts to bring flanges 68 and 70 close together so that support base 12 clamps motor housing 18 of motor unit 14 into a fixed position wherein no depth adjustment is possible.

Figure 5:
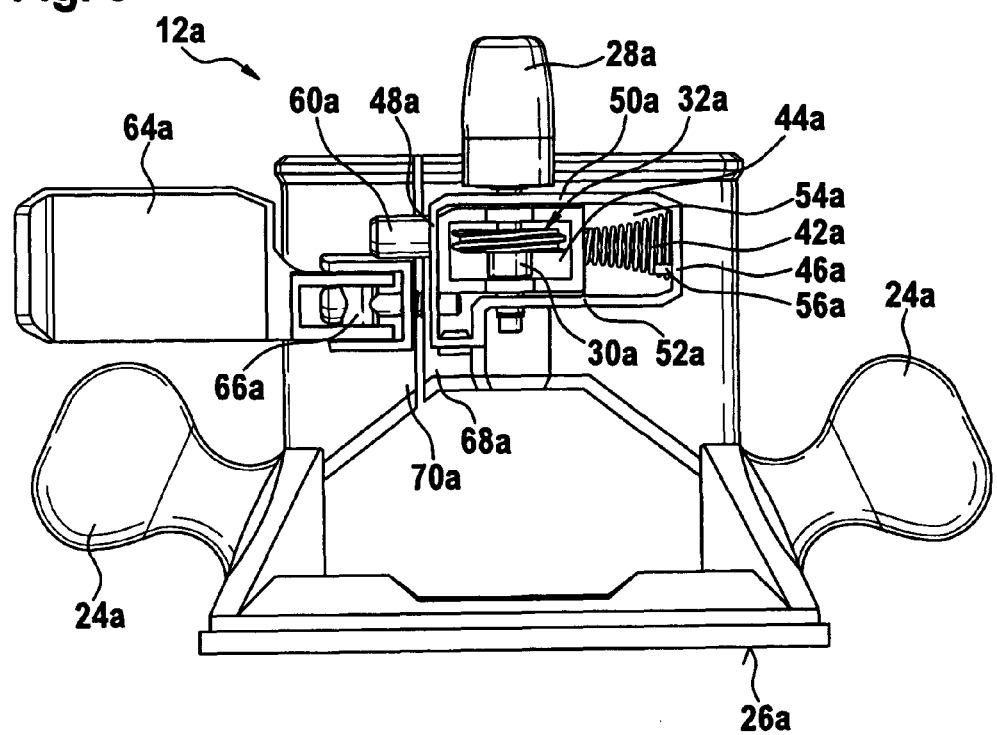
FIG. 5 is a front elevational view of a router base according to second embodiment of the disclosure.

In FIG. 5, an alternative, but entirely analogous embodiment for the support base is shown. As such, the same numbering scheme is used, but with the addition of an "a" after the number to indicate the feature is from the alternative embodiment of FIG. 5. Notably, the orientation of bracket 38a within channel 44a has been reversed. Further differences in details are illustrated in FIG. 5 but not described in detail here.

Figure 6:
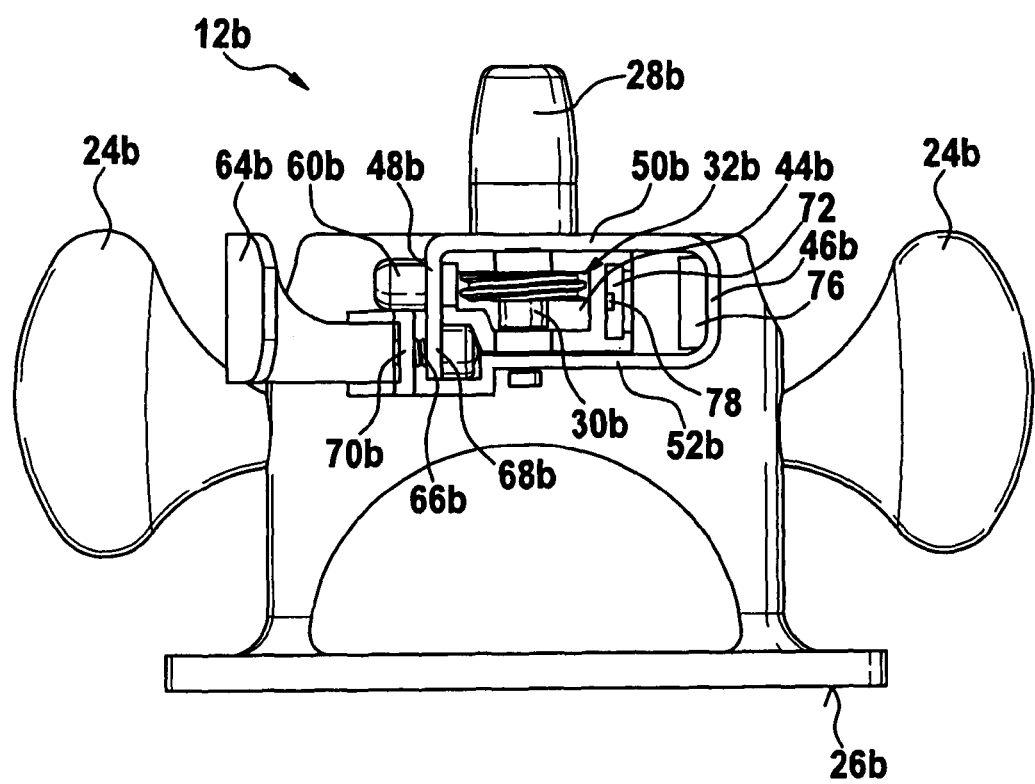
FIG. 6 is a front elevational view of a router base according to a third embodiment of the disclosure.

A further alternative embodiment which is more substantially different from the initial embodiment is shown in FIGS. 6 and 7. Once again, the same numbering scheme is used for common elements, but in this cased followed by a "b". In this embodiment, the biasing force on bracket 38b is provided by magnetic repulsion. Permanent magnet 72 is mounted onto bracket 38b in cavity 74 and a second permanent magnet 76 is fixed in position within channel 44b. The magnet pair is chosen so that the two magnets 72 and 76 repel one another, thereby urging bracket 38b into the default position as with the first embodiment. In order to retain permanent magnet 72 in cavity 74, a flexible snap-fit arm 78 is provided on bracket 38b. Other features of bracket 38b, such as push button 60b and apertures 40b are comparable to those in the initial embodiment.

It is foreseen that an alternative configuration using magnets that attract one another could also be used to retain bracket 38b in the default position, but this is less desirable since the user would either need to pull at the bracket rather than push, or a push button would need to be devised that was configured to not interfere with the magnet pair and still permit a pushing motion.

The invention claimed is:

1. A power tool having a depth adjustment mechanism comprising:
   a motor having a motor housing;
   a support base configured to support the motor housing;
   a depth adjustment member coupled to the support base and movable between two positions; and
   a pair of magnets that repel one another for biasing the depth adjustment member into the first position,
   wherein the depth adjustment member in a first position contacts a surface portion of the motor housing and in a second position is distanced from the surface portion of the motor housing; and
   wherein movement of the depth adjustment member from the first position to the second position is in a direction parallel to a plane that is substantially tangent to the surface portion of the motor housing.

2. A power tool according to claim 1, wherein the depth adjustment member is a worm gear and the surface portion of the motor housing comprises a plurality of teeth which are compatible with the worm gear.

3. A power tool according to claim 1, wherein the power tool further comprises a conic spring configured to bias the depth adjustment member into the first position.

4. A power tool according to claim 1, wherein the depth adjustment member is rotatable with respect to a carrier that is configured to move the depth adjustment member from the first position to the second position.

5. A power tool according to claim 4, wherein the carrier is positioned within a channel in the support base, and wherein the channel has a plurality of channel walls.

6. A power tool according to claim 5, wherein a first channel wall is moveable with respect to the channel and movement of said first channel wall controls a clamping mechanism configured to clamp the support base to the motor housing.

7. A power tool according to claim 5, wherein a portion of the carrier extends through a second channel wall for allowing a user to move the carrier within the channel.

8. A power tool according to claim 5, wherein a longitudinal slot is provided on a third channel wall, and wherein the longitudinal slot is configured to guide movement of the carrier within the channel.

9. A power tool according to claim 8, further comprising an adjustment device that extends through the longitudinal slot in the third channel wall and is configured to manipulate the depth adjustment member within the channel.

* * * * *